US008719775B1

(12) United States Patent
Cole et al.

(10) Patent No.: US 8,719,775 B1
(45) Date of Patent: May 6, 2014

(54) METHODS AND APPARATUS FOR RECORDING AND PLAYBACK OF AN EXECUTED PROCESS

(75) Inventors: Gregory M. Cole, Aptos, CA (US); Florentin N. Wandeler, Kanata (CA)

(73) Assignee: Adobe Systems Incorporated, San Jose, CA (US)

( * ) Notice: Subject to any disclaimer, the term of this patent is extended or adjusted under 35 U.S.C. 154(b) by 977 days.

(21) Appl. No.: 12/139,921

(22) Filed: Jun. 16, 2008

(51) Int. Cl.
*G06F 9/44* (2006.01)

(52) U.S. Cl.
USPC ........... 717/113; 717/109; 717/124; 717/125; 717/127

(58) Field of Classification Search
None
See application file for complete search history.

(56) References Cited

U.S. PATENT DOCUMENTS

| 6,330,008 B1 * | 12/2001 | Razdow et al. ............... 715/772 |
| 2005/0027495 A1 * | 2/2005 | Matichuk ........................ 703/2 |

OTHER PUBLICATIONS

Russell, et al. "Software Development Issues for Parallel Processing", 1988, IEEE, p. 306-307.*
Hewlett Packard, HP3000 Manuals, Symbolic Debugger/iX Users Guide: Copyright Notice, http://www.hpmmsupport.com/MPE Manual/5000/B3150890014.1209, as available via the Internet and printed Jun. 18, 2012.
Silverstein, M., Logical Capture Replay, Tools & Automation, Nov./Dec. 2003, web page at www.stqemagazine.com, as available via the Internet.
Cosmic Software, Cosmic Software ZAP Debugger for S12X and XGATE, web page at http://www.cosmic-software.com/s12x_zap_des.php, as available via the Internet and printed Jun. 18, 2012.

* cited by examiner

*Primary Examiner* — Qamrun Nahar
(74) *Attorney, Agent, or Firm* — Kilpatrick Townsend & Stockton LLP

(57) ABSTRACT

A system interprets a process map. The process map indicates a plurality of steps associated with a process. The process map provides a visual representation of the steps. The system executes the process according to the process map, and captures an execution of the process in a recording. The system provides a capability to traverse the recording according to the process map.

23 Claims, 11 Drawing Sheets

225 PROVIDE A CAPABILITY TO TRAVERSE THE RECORDING ACCORDING TO THE PROCESS MAP

226 RENDER THE RECORDING AS A PLURALITY OF STEPS, EACH STEP RENDERED WITH AT LEAST ONE OF:
i) AN ASSOCIATED PORTION OF THE PROCESS MAP, AND
ii) DATA ASSOCIATED WITH THE EXECUTION OF THE PROCESS AT THAT STEP

OR

227 INTERROGATE THE RECORDING TO OBTAIN DATA ASSOCIATED WITH THE EXECUTION OF THE PROCESS FROM AT LEAST ONE SOURCE

228 PROVIDE THE DATA DURING A TRAVERSAL OF THE RECORDING, THE DATA RENDERED AS ASSOCIATED WITH EACH CORRESPONDING STEP OF THE TRAVERSAL OF THE RECORDING

*FIG. 9*

229 PROVIDE A CAPABILITY TO TRAVERSE THE RECORDING ACCORDING TO THE PROCESS MAP

230 PROVIDE A CAPABILITY TO REVERSE THE DIRECTION OF A TRAVERSAL OF THE RECORDING

OR

231 PROVIDE AN ABILITY TO INVOKE AN AUTOMATED TRAVERSAL OF THE RECORDING

232 PROVIDE AN ABILITY TO TERMINATE THE AUTOMATED TRAVERSAL OF THE RECORDING DURING THE TRAVERSAL OF THE RECORDING

OR

233 PROVIDE AN ABILITY TO TOGGLE BETWEEN THE AUTOMATED TRAVERSAL OF THE RECORDING AND A MANUALLY INVOKED TRAVERSAL OF THE RECORDING

*FIG. 10*

METHODS AND APPARATUS FOR RECORDING AND PLAYBACK OF AN EXECUTED PROCESS

FIELD

The present disclosure generally relates to computer systems and more specification relates to recording and playback of an executed process.

BACKGROUND

Conventional technologies for debugging source code and associated processes allow users to step through the execution of the source code while interrogating the values of variables associated with the source code. As the source code executes, users can compare the difference between what the source code is actually doing during the execution and what the source code is authored to do during execution. Typically, debugging is performed on a single machine with a single execution of source code. Often conventional technologies for debugging source code are as simple as inserting print statements throughout the code such that the values of variables are printed out at various stages during execution of the source code. This can be a simple yet useful method for debugging source code as long as the user knows, or at least, suspects the location in the source code where a potential error might exist. Once the error is located (and hopefully fixed), the print statements are removed from the source code.

SUMMARY

Conventional technologies for debugging source code and associated processes suffer from a variety of deficiencies. In particular, conventional technologies for debugging source code and associated processes are limited in that executing a single instance of a process on a single machine does not mimic the real environment in which the process would be executing. Realistically, the process is more likely to be one of many processes executing on a server, interacting with various different sources to obtain data, manipulate data and then transfer data to other sources. Debugging that occurs in a shared server environment is complicated by the server's need to continue to serve requests that it receives from other connections. Without having a dedicated 'debug server' (isolated from other connections), it is not possible to debug (using conventional technologies for debugging) because the debugging is intrusive (i.e., the server is 'stopped' while the current breakpoint is evaluated by the user).

Conventional technologies for debugging source code and associated processes allow a user to step through source code while that source code is executing, and view the state of the data (i.e., variable values, function calls, etc.) at each step. However, conventional technologies do not allow a user to step backwards through source code. Conventional technologies for debugging source code and associated processes are inefficient in this regard because typically a user will run the debugger once to locate the error, and then run the debugger (at least) a second time, paying particular attention to the state of the data at the location (in the source code) right before the error. When an exception occurs during execution of a process (often referred to as "the program/process blew up" or "the program/process crashed"), users operating a traditional debugger may not know where, in the source code, the exception occurred. It may take the user several tries, slowly stepping through the source code to discover where the exception occurred to obtain the state of the data at the location right before the exception occurred.

Embodiments disclosed herein significantly overcome such deficiencies and provide a system that includes a computer system executing an executed process recording and playback process that interprets a process map. The computer system is capable of recording data values generated during the interpretation of a process map in order that the execution flow and data value updates can be replayed at a future point in time for purpose of visualization. The process map indicates a plurality of steps associated with a process. The process map provides a visual representation of the steps. The executed process recording and playback process executes the process according to the process map, and captures an execution of the process in a recording. The executed process recording and playback process then provides a capability to traverse the recording according to the process map.

In an example embodiment, the executed process recording and playback process operates on a server running a plurality of other processes. A process engine interprets the process map, and executes the process. The process engine detects that the process is operating in 'record mode' and a recording of the process is captured. A user can set the process to 'record mode' or turn off 'record mode' at any point prior to and during execution of the process. When the process engine detects that the process is no longer in 'record mode', the process engine ceases the recording of the process.

Once a recording of the process has been captured, a user may step through the recording, viewing the state of the data at each step. The user may even step backwards through the recording, again, viewing the state of the data at any given step. In an example embodiment, a graphical user interface is provided allowing a user to playback the recording in a graphical environment. The graphical user interface provides a visual representation of the process map, depicted as a plurality of steps depicted as linked together with graphical icons depicted as arrows. During traversal of the recording, those steps that have been traversed are depicted, for example, as being linked together with arrows of one color, and those steps that are to be traversed are depicted as being linked together with arrows of a different color. The routes between steps that were not accessed during execution of the process are depicted with yet a third color so that a user can instantly discern the steps that have been encountered, the steps that will be encountered, and the steps that will never be encountered during this particular execution of the process.

If an exception (i.e., an unexpected and unplanned for error condition) occurred during execution of a process, during the traversal of a recording of that process, the step at which the exception occurred is depicted as having a different color from the other steps, so as to alert the user of the location in the process of the exception. During a traversal of the recording, the current step of the traversal is highlighted with a different color than the other steps in the process map. The graphical user interface has a variable rendering region, and provides a visual representation of at least one variable associated with the process. As a user traverses the recording, if the value of the variable changes during the traversal, that variable is highlighted with color indicating that variable change.

In an example embodiment, during the capture of the recording of the executing process, the process map (that is executed at the time of the execution of the process) is also associated with the recording. Thus, each time the recording is executed, the process map associated with that recording is executed.

In an example embodiment, data inputted during execution of the process is also captured and associated with the recording. This enables future executions of that process to run the process using the same data set.

In an example embodiment, a user can step through the recording, or invoke an automated traversal of the recording. At any time, a user can switch between running the automated traversal, and manually stepping (i.e., traversing) through the recording.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 9 illustrates a flowchart of a procedure performed by the system of FIG. 1, when the executed process recording and playback process provides a capability to traverse the recording according to the process map, according to one embodiment disclosed herein.

FIG. 10 illustrates a flowchart of a procedure performed by the system of FIG. 1, when the executed process recording and playback process provides a capability to traverse the recording, and provides a capability to reverse the direction of a traversal of the recording, according to one embodiment disclosed herein.

DETAILED DESCRIPTION

Embodiments disclosed herein include a computer system executing an executed process recording and playback process that interprets a process map. The process map indicates a plurality of steps associated with a process. The process map provides a visual representation of the steps. The executed process recording and playback process executes the process according to the process map, and captures an execution of the process in a recording. The executed process recording and playback process then provides a capability to traverse the recording according to the process map.

Figure 1:
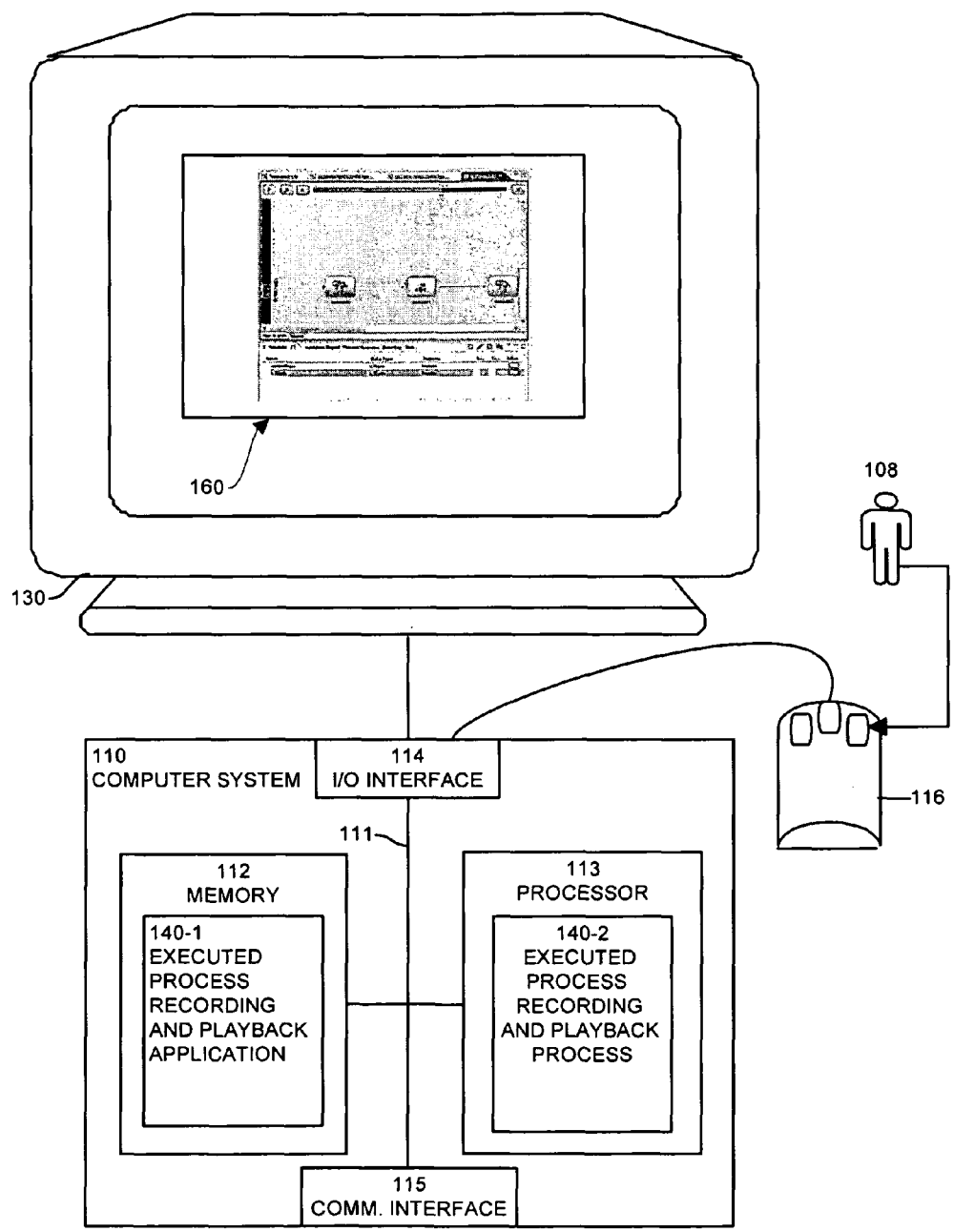
FIG. 1 shows a high level view of a system according to one embodiment disclosed herein.

FIG. 1 is a block diagram illustrating example architecture of a computer system 110 that executes, runs, interprets, operates or otherwise performs an executed process recording and playback application 140-1 and executed process recording and playback process 140-2 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the playlist execution engine generating application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with an executed process recording and playback application 140-1 as explained herein. The executed process recording and playback application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of an executed process recording and playback application 140-1. Execution of an executed process recording and playback application 140-1 in this manner produces processing functionality in executed process recording and playback process 140-2. In other words, the executed process recording and playback process 140-2 represents one or more portions or runtime instances of an executed process recording and playback application 140-1 (or the entire an executed process recording and playback application 140-1) performing or executing within or upon the processor 113 in the computerized device 110 at runtime.

It is noted that example configurations disclosed herein include the executed process recording and playback application 140-1 itself (i.e., in the form of un-executed or non-performing logic instructions and/or data). The executed process recording and playback application 140-1 may be stored on a computer readable medium (such as a floppy disk), hard disk, electronic, magnetic, optical, or other computer readable medium. An executed process recording and playback application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of an executed process recording and playback application 140-1 in the processor 113 as the executed process recording and playback process 140-2. Those skilled in the art will understand that the computer system 110 may include other processes and/or software and hardware components, such as an operating system not shown in this example.

A display 130 need not be coupled directly to computer system 110. For example, the executed process recording and playback application 140-1 can be executed on a remotely accessible computerized device via the network interface 115. In this instance, the graphical user interface 160 may be displayed locally to a user 108 of the remote computer, and execution of the processing herein may be client-server based.

Further details of configurations explained herein will now be provided with respect to a flow chart of processing steps that show the high level operations disclosed herein to perform the executed process recording and playback process 140-2.

Figure 2:
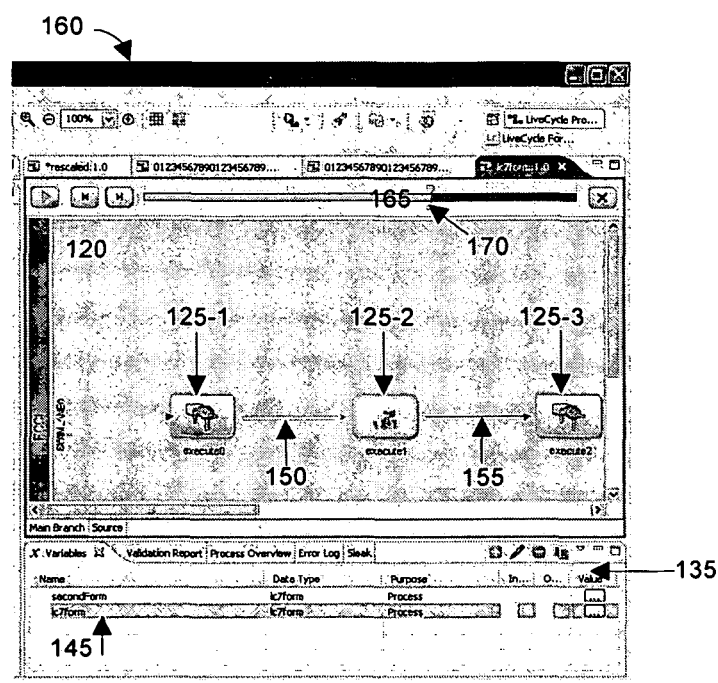
FIG. 2 illustrates an example graphical user interface rendering a process map associated with a captured recording, according to one embodiment disclosed herein.

FIG. 2 is an example screen shot of the graphical user interface 160 provided for a user 108. The process map 120 contains a plurality of steps 125-N, along with a variable rendering region 135 containing a variable 145. The executed process recording and playback process 140-2 provides a visual indication of the step 125-1 and step 125-2 that have been traversed via a traversed step arrow 150, along with a step to be traversed arrow 155 indicating the next step 125-3 that will be traversed during the playback of the recording. A scroll bar 165 with an icon 170 allows the user 108 to see how far the recording has been traversed.

Figure 3:
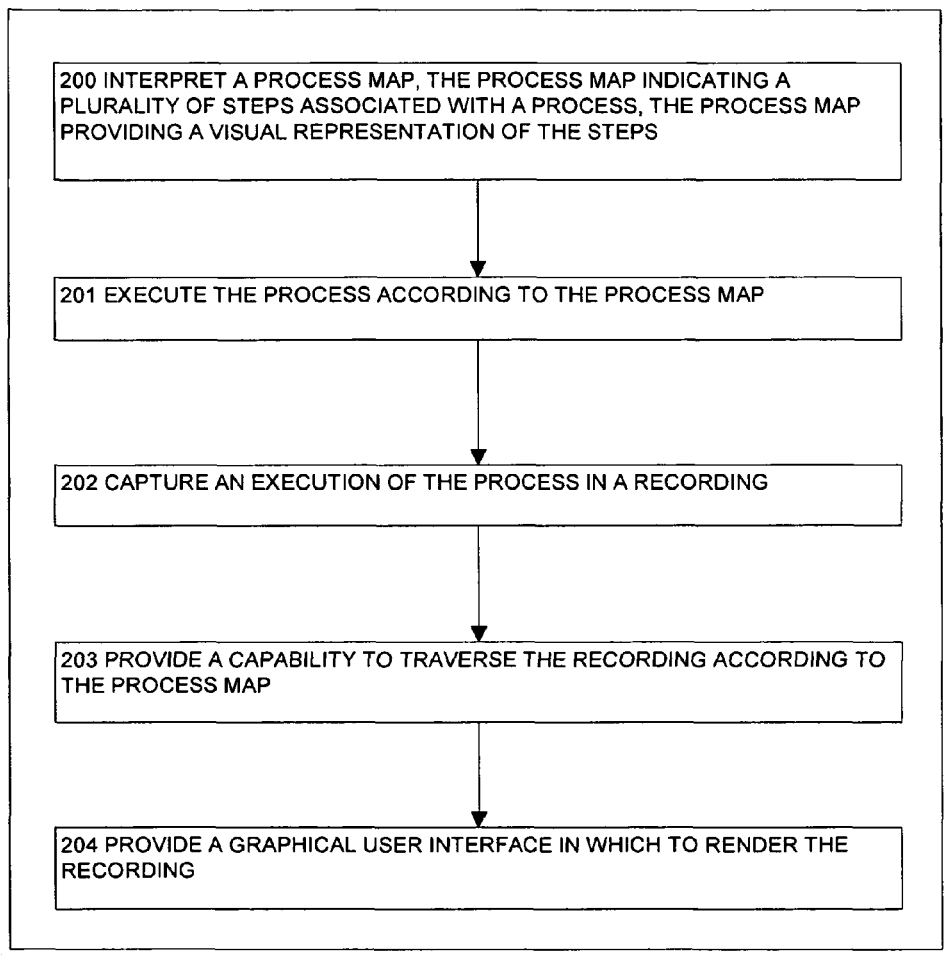
FIG. 3 illustrates a flowchart of a procedure performed by the system of FIG. 1, when the executed process recording and playback process interprets a process map, the process map indicating a plurality of steps associated with a process, the process map providing a visual representation of the steps, according to one embodiment disclosed herein.

FIG. 3 is an embodiment of the steps performed by executed process recording and playback process 140-2 when it interprets a process map.

In step 200, the executed process recording and playback process 140-2 interprets a process map 120. The process map 120 indicates a plurality of steps associated with a process. The process map 120 provides a visual representation of the steps. In an example embodiment, a user 108 creates a process map 120. The process map 120 may, for example, link together a variety of function calls necessary to perform a process. The process map 120 may also have branches indicating different paths the process may take during execution depending on, for example, the data inputted into the process, the results of a calculation during the process, etc. A process engine on a server interprets the process map 120, essentially, figuring out what to do next in the process.

In step 201, the executed process recording and playback process 140-2 executes the process according to the process map 120. In the graphical user interface 160, a user 108 may invoke execution of the process. This allows the user to view the execution of the process visually. The graphical user interface 160 renders the process map 120, and data that is associated with the executing process. The data is rendered in the variable rendering region 135.

In step 202, the executed process recording and playback process 140-2 captures an execution of the process in a recording. The process engine that executes the process map 120 is extended such that everything that flows through the process engine (associated with that process) during execution of the process is captured in a recording.

In step 203, the executed process recording and playback process 140-2 provides a capability to traverse the recording according to the process map 120. In an example embodiment, a graphical user interface 160 provides a listing of recordings of the executions of processes, along with a timestamp when the process was initiated, and a timestamp associated with the last modification of the recording. A user 108 may select which of the available recordings to render within the graphical user interface 160, and to subsequently traverse. During the traversal of the recording, the recording is interrogated to obtain all the data that was collected. This data is available during playback (or traversal) of the recording. In an example embodiment, a user 108 may select which recordings to delete (such as obsolete recordings), or even delete all the recordings.

In step 204, the executed process recording and playback process 140-2 provides a graphical user interface 160 in which to render the recording. The graphical user interface 160 includes, but is not limited to:

A visual representation of the process map 120.

A visual representation of at least one of the plurality of steps 125-N associated with the process. In an example embodiment, the plurality of steps 125-N that comprise the process map 120 is visually depicted. The plurality of steps 125-N is linked together with arrows indicating various routes through the process map 120 that the process may take during execution. The arrows are colored with a default color indicating that the steps have not been traversed during execution of the recording.

A visual representation of at least one of the plurality of steps that has been traversed during a traversal of the recording. In an example embodiment, when a step has been traversed, the color of the arrow linking (that step with a previous step) is modified to indicate that that step has been traversed (i.e., the traversed step arrow 150). In another example embodiment, the color of the arrow linking the current step 125-1 with the next step 125-2 (in the process) is modified to indicate that this step 125-2 is the next step 125-2 the process will take (i.e., the step to be traversed arrow 155). In an example embodiment, the plurality of future steps is identified by a plurality of step to be traversed arrows 155.

A visual representation of at least one of the plurality of steps 125-N associated with the process. The visual representation indicates that at least one of the plurality of steps 125-N associated with the process is the current step 125-2 during a traversal of the recording.

A visual representation of at least one of the plurality of steps 125-N associated with the process indicating that step 125-3 has encountered an exception during the execution of the process. In an example embodiment, that step 125-3 is rendered having a different color (from the other steps 125-N depicted in the process map 120), indicating to the user 108 that an exception has occurred.

A variable rendering region 135 within the graphical user interface 160.

A visual representation of at least one variable 145 associated with the process.

A visual representation of at least one variable 145, the visual indicating that variable 145 has been modified during the traversal of the recording. In an example embodiment, during traversal of a recording, when the value of a variable 145 has changed, that variable 145 is highlighted with a different color (from the other variables 145) within the variable rendering region 135. Equally of use to the user 108 is the fact that those variables 145 that have not been modified are not highlighted with a different color. This allows the user 108 to quickly discern which variables 145 have been modified and which haven't.

An indication that there is additional data associated with the at least one variable 145. In an example embodiment, the variable rendering region 135 depicts the value of the variable 145 as " . . . " indicating that the user 108 may select the " . . . " to view additional data associated with that variable 145.

The capability to invoke, from the graphical user interface 160, the recording of the execution of the process. In an example embodiment, a user 108 may invoke or terminate the recording of a process anytime prior to and during execution of that process.

Figure 4:
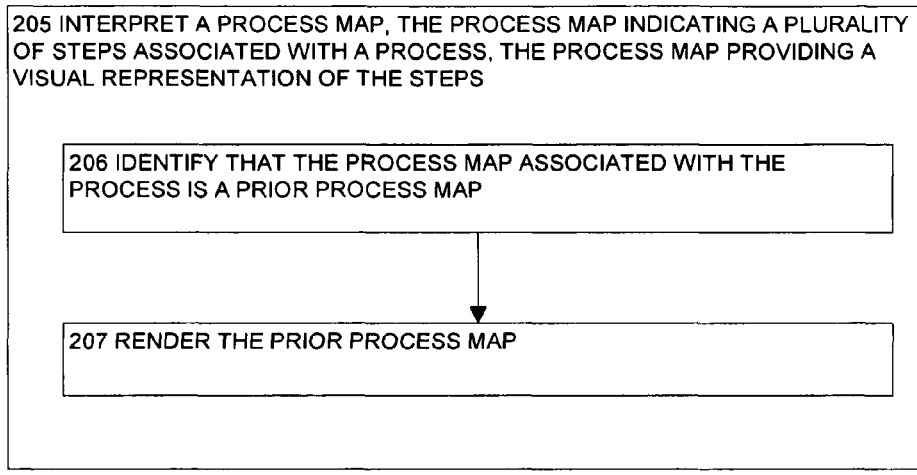
FIG. 4 illustrates a flowchart of a procedure performed by the system of FIG. 1, when the executed process recording and playback process interprets a process map, and identifies that the process map associated with the process is a prior process map, according to one embodiment disclosed herein.

FIG. 4 is an embodiment of the steps performed by executed process recording and playback process 140-2 when it interprets a process map 120.

In step 205, the executed process recording and playback process 140-2 interprets a process map 120. The process map 120 indicates a plurality of steps associated with a process. The process map 120 provides a visual representation of the steps.

In step 206, the executed process recording and playback process 140-2 identifies that the process map 120 associated with the process is a prior process map 120. A user 108 may modify a process map 120 associated with a process. That modified process map 120 is the current process map 120 until the next modification of that process map 120. However, the process map 120 associated with a recording may be a prior version of the process map 120. When the executed process recording and playback process 140-2 captures a recording of an execution of the process, the executed process recording and playback process 140-2 also captures the process map 120 that is the current process map 120 at the time of the execution of the process. Thus, when a user 108 is traversing a recording of an executed process in the graphical user interface 160, the process map 120 that was current at the time of the execution of the process may now be a prior version of the process map 120. During traversal of the recording, the executed process recording and playback process 140-2 renders the process map 120 associated with that recording.

In step 207, the executed process recording and playback process 140-2 renders the prior process map 120. Once the executed process recording and playback process 140-2 identifies that the process map 120 associated with a recording is not the current process map 120 associated with the process (captured by the recording), the executed process recording and playback process 140-2 renders the prior process map 120 in the graphical user interface 160. Thus, the user 108 traversing the recording can view the process map 120 that was the current process map 120 when the execution of the process was captured. In an example embodiment, when the user invokes a recording in the graphical user interface 160, the executed process recording and playback process 140-2 identifies the process map 120 associated with that recording, and renders that process map 120 in the graphical user interface 120 prior to and during the traversal of the recording.

Figure 5:
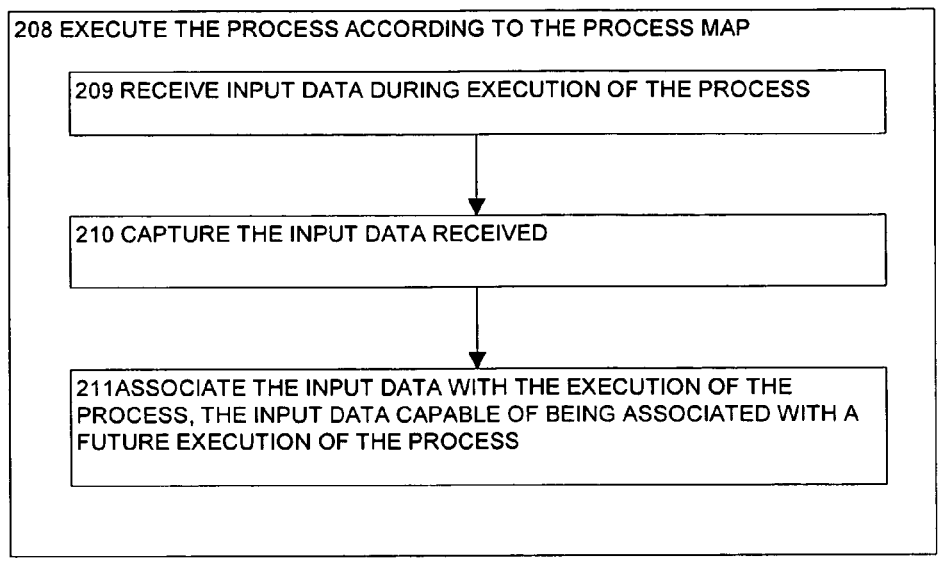
FIG. 5 illustrates a flowchart of a procedure performed by the system of FIG. 1, when the executed process recording and playback process executes the process according to the process map, according to one embodiment disclosed herein.

FIG. 5 is an embodiment of the steps performed by executed process recording and playback process 140-2 when it executes the process according to the process map 120.

In step 208, the executed process recording and playback process 140-2 executes the process according to the process map 120. A process engine on a server executes the process map. For example, a process map may specify which functions to call, when to accept data, and where to transmit data during the execution of the process.

In step 209, the executed process recording and playback process 140-2 receives input data during execution of the process. For example, a process that determines whether an applicant qualifies for a mortgage may require input data such as salary, mortgage value, down payment, credit scores, etc.

In step 210, the executed process recording and playback process 140-2 captures the input data received. During the execution of the process, the executed process recording and playback process 140-2 captures the input data. This input data can be captured whether it is inputted prior to execution of the process or during execution of the process. For example, the process that determines whether an applicant qualifies for a mortgage may require input data at the beginning of execution of the process, but may also require additional input data during the execution of the process.

In step 211, the executed process recording and playback process 140-2 associates the input data with the execution of the process. The input data is capable of being associated with a future execution of the process. Thus, if the input data is complex, and a future execution of the process requires that same input data, the executed process recording and playback process 140-2 associates the input data with the execution of that process. The input data can now be used with a future execution of that process. This is helpful during regression testing of processes to insure that recent modifications of processes still produce the desired results of previous versions of the process.

Figure 6:
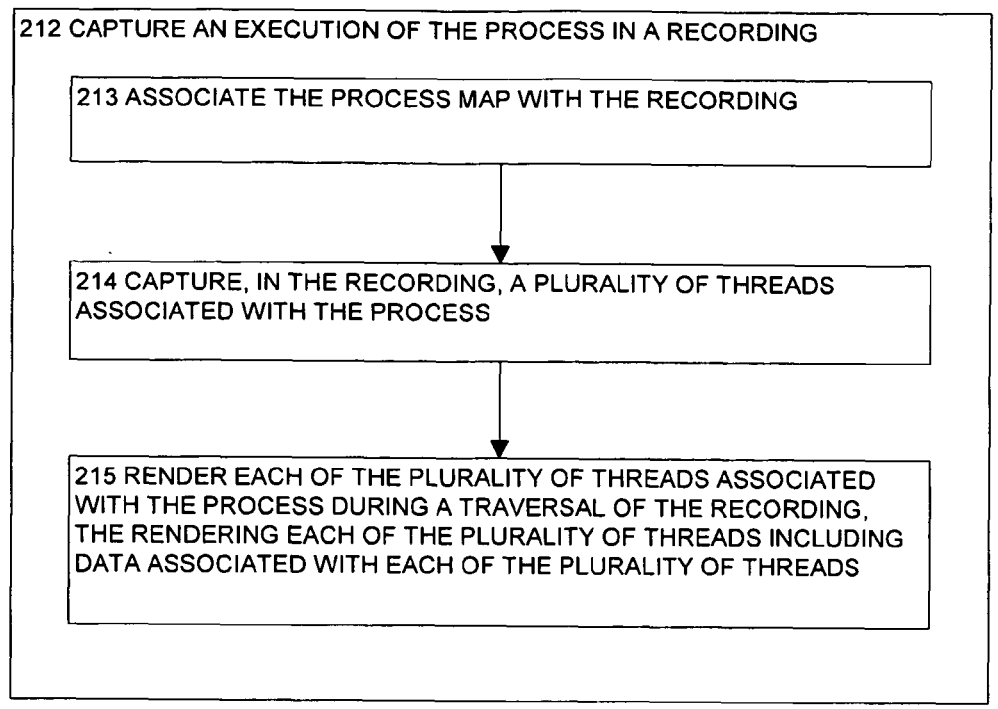
FIG. 6 illustrates a flowchart of a procedure performed by the system of FIG. 1, when the executed process recording and playback process captures an execution of the process in a recording, according to one embodiment disclosed herein.

FIG. 6 is an embodiment of the steps performed by executed process recording and playback process 140-2 when it captures an execution of the process in a recording.

In step 212, the executed process recording and playback process 140-2 captures an execution of the process in a recording. During the capture of a recording, data that flows through the process engine (that is associated with that process) is captured in a recording.

In step 213, the executed process recording and playback process 140-2 associates the process map 120 with the recording. The process map 120 that is current during the execution of the process is captured and associated with the recording. During traversal of the recording in the graphical user interface 160, the executed process recording and playback process 140-2 displays the process map 120 that was current during the execution of the process.

In step 214, the executed process recording and playback process 140-2 captures, in the recording, a plurality of threads associated with the process. In an example embodiment, a process may spawn a plurality of threads during execution of the process. The executed process recording and playback process 140-2 is able to capture each of these threads. It is possible to have concurrently executing branches within a process. The executed process recording and playback process 140-2 captures and renders a visual depiction of each concurrently executing branch, revealing to the user 108 the order in which they run. In multi-threaded programming, the executed process recording and playback process 140-2 allows the user 108 to view the threads as they execute in parallel.

In step 215, the executed process recording and playback process 140-2 renders each of the plurality of threads associated with the process during a traversal of the recording. The rendering each of the plurality of threads includes data associated with each of the plurality of threads. During traversal of the recording in the graphical user interface 160, the executed process recording and playback process 140-2 renders each of the threads and also provides data that is associated with each thread. Thus, as a user 108 traverses a recording, the user 108 can view the threads spawned by the execution of the process, along with data (and data changes) associated with those threads. The data is rendered within the variable rendering region 135.

Figure 7:
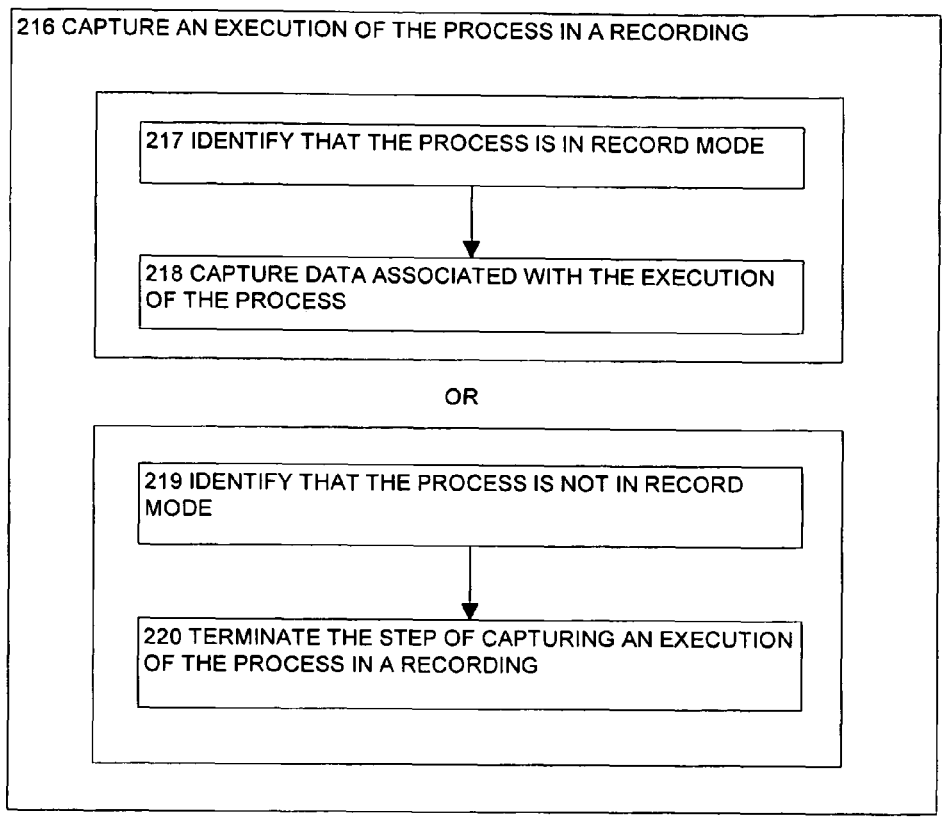
FIG. 7 illustrates a flowchart of a procedure performed by the system of FIG. 1, when the executed process recording and playback process captures an execution of the process in a recording, and identifies that the process is in record mode, according to one embodiment disclosed herein.

FIG. 7 is an embodiment of the steps performed by executed process recording and playback process 140-2 when it captures an execution of the process in a recording.

In step 216, the executed process recording and playback process 140-2 captures an execution of the process in a recording.

In step 217, the executed process recording and playback process 140-2 identifies that the process is in record mode. When a process is executing on a server, the executed process recording and playback process 140-2 determines whether the process is in record mode.

In step 218, the executed process recording and playback process 140-2 captures data associated with the execution of the process. If the executed process recording and playback process 140-2 determines that an executing process is in record mode, the executed process recording and playback process 140-2 captures all the data associated with that process at each step.

Alternatively, in step 219, the executed process recording and playback process 140-2 identifies that the process is not in record mode. At any time in the process, a user 108 can start or stop the recording of the process. For example, a user 108 may invoke 10,000 instances of a process on Monday, and on Tuesday, (while the process is still running), determine that there's an error occurring in that process. The user 108 may set the process in record mode such that any future execution of the process will be captured. Likewise, at any point prior to execution or during execution of the process, the user 108 may turn off record mode on the process (and then, turn it back on at any point). The executed process recording and playback process 140-2 is capable of determining whether the process is in record mode.

In step 220, the executed process recording and playback process 140-2 terminates the step of capturing an execution of the process in a recording. In an example embodiment, once the executed process recording and playback process 140-2 determines that the process is no longer in record mode, the executed process recording and playback process 140-2 terminates capturing the recording of the process.

Figure 8:
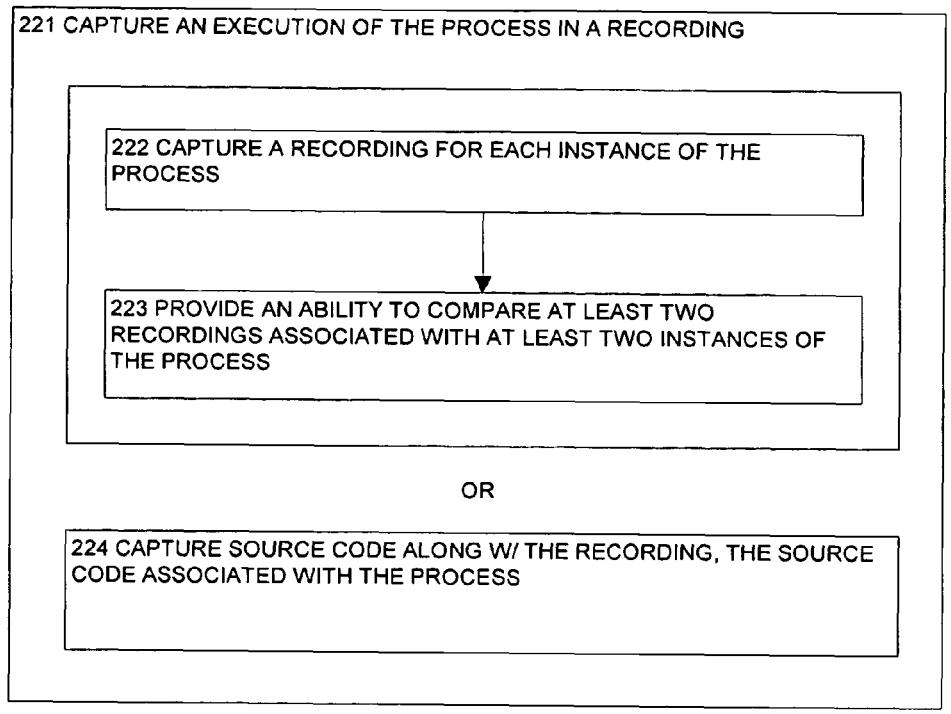
FIG. 8 illustrates a flowchart of a procedure performed by the system of FIG. 1, when the executed process recording and playback process captures an execution of the process in a recording for each instance of the process, according to one embodiment disclosed herein.

FIG. 8 is an embodiment of the steps performed by executed process recording and playback process 140-2 when it captures an execution of the process in a recording.

In step 221, the executed process recording and playback process 140-2 captures an execution of the process in a recording. Once the executed process recording and playback process 140-2 determines that a process that is executing has been set to record mode, the executed process recording and playback process 140-2 captures the execution of that process in a recording. In an example embodiment, the recordings may be large, capturing several weeks worth of data collected during execution of a process.

In step 222, the executed process recording and playback process 140-2 captures a recording for each instance of the process. The executed process recording and playback process 140-2 captures an individual recording for each instance of a process that is executing. In some cases, there may be thousands of instances of execution of a process, for example, on an online web site selling a popular item. There may be thousands of customers purchasing items, invoking the process of filling and checking out of an online shopping cart.

In step 223, the executed process recording and playback process 140-2 provides an ability to compare at least two recordings associated with at least two instances of the process. Since the executed process recording and playback process 140-2 captures an individual recording for each instance of a process, a user 108 can compare these instances. This may provide additional debugging data to the user 108 based on, for example, different input data provided to the different instances of the process.

Alternatively, in step 224, the executed process recording and playback process 140-2 captures source code along with the recording. The source code is associated with the process. Thus, a user 108 traversing the recording can view the source code that was executing at the time of the capture of the recording. This is helpful when identifying the location of an error during execution of a process and then quickly being able to also locate the place in the source code where that error is coded.

FIG. 9 is an embodiment of the steps performed by executed process recording and playback process 140-2 when it provides a capability to traverse the recording according to the process map 120.

In step 225, the executed process recording and playback process 140-2 provides a capability to traverse the recording according to the process map 120. In an example embodiment, a graphical user interface 160 is provided allowing a user 108 to visually traverse the recording, viewing the process map 120 along with any data changes that occur during the execution of the process.

In step 226, the executed process recording and playback process 140-2 renders the recording as a plurality of steps 125-N, each step 125-N rendered with at least one of:

i) An associated portion of the process map 120. In an example embodiment, each portion of the process map 120 is rendered as an individual step 125-1 within the graphical user interface 160.

ii) Data that is associated with the execution of the process at that step. The data is rendered in the variable rendering region 135. In an example embodiment, during traversal of the recording, as variables change within the variable rendering region 135, they are highlighted with a different color to alert a user 108 that that particular variable 145 has been modified. The value of the variable 145 is rendered within the variable rendering region 135. In another example embodiment, the value of the variable 145 may be too complex to render within the variable rendering region 135. For example, the value of the variable 145 may be an XML variable, a document, etc. In this scenario, the variable rendering region 135 renders the value of the variable 145 as " . . . ". The user 108 may select the " . . . " to view the value of the complex variable.

Alternatively, in step 227, the executed process recording and playback process 140-2 interrogates the recording to obtain data associated with the execution of the process from at least one source. In an example embodiment, during traversal of the recording, the executed process recording and playback process 140-2 interrogates the recording to obtain all the data collected during the capture of the recording. The executed process recording and playback process 140-2 then renders this data within the graphical user interface 160.

In step 228, the executed process recording and playback process 140-2 provides the data during a traversal of the recording. The data is rendered as associated with each corresponding step of the traversal of the recording. Thus, as each step 125-1 of the process map 120 is traversed, the executed process recording and playback process 140-2 updates the variable rendering region 135 with data related to the variable 145. The variable rendering region 135 may also include additional variable information such as the type of data associated with each variable rendered within the variable rendering region 135.

FIG. 10 is an embodiment of the steps performed by executed process recording and playback process 140-2 when it provides a capability to traverse the recording according to the process map 120.

In step 229, the executed process recording and playback process 140-2 provides a capability to traverse the recording according to the process map 120. In an example embodiment, using the graphical user interface 160, a user 108 may traverse the recording. The recording is visually rendered within the graphical user interface 160. The graphical user interface 160 displays to the user 108 the available recordings to traverse. The user 108 selects the recording to traverse, and the executed process recording and playback process 140-2 renders that recording in the graphical user interface 160. The recording is rendered with the process map 120 that was current at the time of execution of the process along with the variables associated with the process. The variable information is rendered within the variable rendering region 135.

In step 230, the executed process recording and playback process 140-2 provides a capability to reverse the direction of a traversal of the recording. In an example embodiment, the executed process recording and playback process 140-2 allows a user 108 to step through the recording both forwards and backwards. With each step, the executed process recording and playback process 140-2 updates the progress of the traversal through the process map 120, and the variable rendering region 135 according to the current step 125-1 being traversed. By providing the user 108 with the ability to step backward through the traversal of a recording, the executed process recording and playback process 140-2 provides the user 108 with key debugging information. The user 108 does not have to restart the debugging process and step through the execution of the process, from the beginning, to that location in the process each time the user wishes to view the state of the execution of the process at that location in the process. In another example embodiment, the user 108 may advance to any particular location within the recording. The graphical user interface 160 provides a scroll bar 165 that advances as the recording is traversed. The user 108 may select an icon 170 at the end of the scroll bar 165 and advance (or rewind) the recording to any location in the recording.

Alternatively, in step 231, the executed process recording and playback process 140-2 provides an ability to invoke an automated traversal of the recording. In an example embodiment, a user 108 may traverse the recording step by step, or the user may invoke an automated traversal that traverses the recording automatically without direction from the user 108. The executed process recording and playback process 140-2 provides a time delay between each step 125-1 to allow the user 108 to view the changing data in the graphical user interface 160. This time delay allows the user 108 to visualize/digest/consume the information that has been presented within the graphical user interface 160. The time delay also allows the user 108 to halt the automated traversal if the user 108 determines the current location (in the recording) is a location of interest.

In step 232, the executed process recording and playback process 140-2 provides an ability to terminate the automated traversal of the recording during the traversal of the recording. In an example embodiment, at any time during the automated traversal of the recording, a user 108 may terminate the automated traversal. This is useful when a user 108 is debugging source code and does not know the location of a problem. By invoking the automated traversal, the user 108 can sit back, and watch the traversal of the recording. Once the location of the problem has been located, the user 108 can stop the automated traversal of the recording to view the data associated with the problem.

Alternatively, in step 233, the executed process recording and playback process 140-2 provides an ability to toggle between the automated traversal of the recording and a manually invoked traversal of the recording. In an example embodiment, at any time during the traversal of a recording, a user 108 can toggle between stepping through a traversal manually or invoking an automated traversal of the recording.

Figure 11:
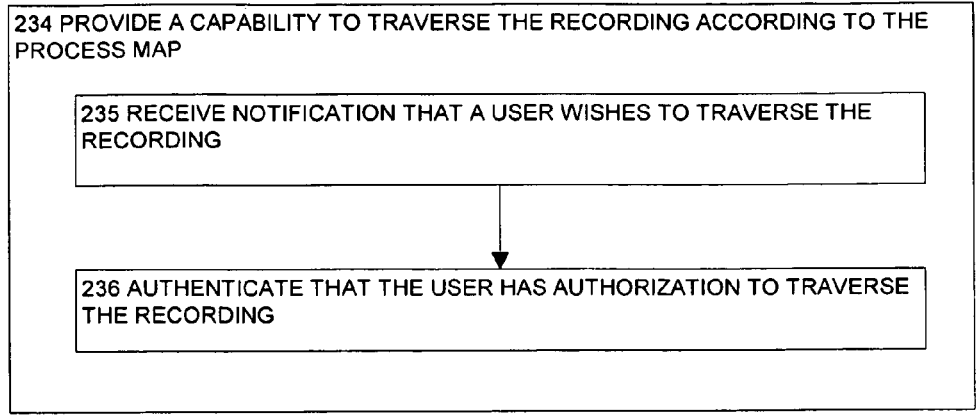
FIG. 11 illustrates a flowchart of a procedure performed by the system of FIG. 1, when the executed process recording and playback process provides a capability to traverse the recording according to the process map, and receives notification that a user wishes to traverse the recording, according to one embodiment disclosed herein.

FIG. 11 is an embodiment of the steps performed by executed process recording and playback process 140-2 when it provides a capability to traverse the recording according to the process map 120.

In step 234, the executed process recording and playback process 140-2 provides a capability to traverse the recording according to the process map 120. For example, a user 108 invokes the graphical user interface 160 and attempts to begin to traverse a recording.

In step 235, the executed process recording and playback process 140-2 receives notification that a user 108 wishes to traverse the recording. In an example embodiment, when a user 108 invokes the graphical user interface 160 and attempts to begin to traverse the recording, the executed process recording and playback process 140-2 receives notification that the user 108 is making this attempt.

In step 236, the executed process recording and playback process 140-2 authenticates the user 108 and verifies that the user 108 has authorization to traverse the recording. Prior to allowing the user 108 to traverse the recording, the executed process recording and playback process 140-2 authenticates that the user 108 has the proper permissions to traverse that recording.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A computer readable medium having computer readable code thereon, the medium comprising:
   instructions for interpreting a process map, the process map indicating a plurality of steps associated with a process and providing a visual representation of the steps, the process map further specifying one or more functions of the process to execute during execution of the process, the one or more functions associated with at least one of the plurality of steps;
   instructions for executing the process according to the process map, including executing the specified one or more functions of the process according to the process map;
   instructions for capturing the executed steps of the process map and associated data during an execution of the process in a recording; and
   instructions for traversing the recording; and
   instructions for, while traversing the recording, displaying and updating the process map according to the traversal of the recording and the steps and functions of the process map.

2. The computer readable medium of claim 1 further comprising:
   instructions for providing a graphical user interface in which to render the recording.

3. The computer readable medium of claim 1 wherein the instructions for interpreting a process map, the process map indicating a plurality of steps associated with a process include:
   instructions for identifying that the process map associated with the process is a prior process map; and
   instructions for rendering the prior process map.

4. The computer readable medium of claim 1 wherein the instructions for executing the process according to the process map include:
   instructions for receiving input data during execution of the process;
   instructions for capturing the input data received; and
   instructions for associating the input data with the execution of the process, the input data capable of being associated with a future execution of the process.

5. The computer readable medium of claim 1 wherein the instructions for capturing an execution of the process in a recording include:
   instructions for associating the process map with the recording;
   instructions for capturing, in the recording, a plurality of threads associated with the process; and
   instructions for rendering each of the plurality of threads associated with the process during a traversal of the recording, the rendering each of the plurality of threads including data associated with each of the plurality of threads.

6. The computer readable medium of claim 1 wherein the instructions for capturing an execution of the process in a recording include:
   instructions for identifying that the process is not in record mode; and
   instructions for terminating the step of capturing an execution of the process in a recording.

7. The computer readable medium of claim 1 wherein the instructions for capturing an execution of the process in a recording include:
   instructions for capturing a separate recording for each instance of the process; and
   instructions for providing an ability to compare at least two recordings associated with at least two instances of the process.

8. The computer readable medium of claim 1 wherein the instructions for capturing an execution of the process in a recording include:
   instructions for capturing source code along with the recording, the source code associated with the process.

9. The computer readable medium of claim 1 wherein the instructions for providing a capability to traverse the recording according to the process map include:
   instructions for rendering the recording as a plurality of steps, each step rendered with at least one of:
   i) an associated portion of the process map, or
   ii) data associated with the execution of the process at that step.

10. The computer readable medium of claim 1 wherein the instructions for providing a capability to traverse the recording according to the process map include:
    instructions for interrogating the recording to obtain data associated with the execution of the process from at least one source; and
    instructions for providing the data during a traversal of the recording, the data rendered as associated with each corresponding step of the traversal of the recording.

11. The computer readable medium of claim 1 wherein the instructions for providing a capability to traverse the recording according to the process map include:
    instructions for providing a capability to reverse the direction of a traversal of the recording.

12. The computer readable medium of claim 1 wherein the instructions for providing a capability to traverse the recording according to the process map include:
    instructions for providing an ability to invoke an automated traversal of the recording.

13. The computer readable medium of claim 12 further comprising:
    instructions for providing an ability to terminate the automated traversal of the recording during the traversal of the recording.

14. The computer readable medium of claim 12 further comprising:
    instructions for providing an ability to toggle between the automated traversal of the recording and a manually invoked traversal of the recording.

15. The computer readable medium of claim 1 wherein the instructions for providing a capability to traverse the recording according to the process map include:
    instructions for receiving a request to traverse the recording; and
    instructions for authenticating the request to traverse the recording.

16. In a computer system, a method comprising:
    interpreting a process map, the process map indicating a plurality of steps associated with a process and providing a visual representation of the steps, the process map further specifying one or more functions of the process to execute during execution of the process, the one or more functions associated with at least one of the plurality of steps;

executing the process according to the process map, including executing the specified one or more functions of the process according to the process map;

capturing the executed steps of the process map and associated data during an execution of the process in a recording;

traversing the recording; and while traversing the recording, displaying and updating the process map according to the traversal of the recording and the steps and functions of the process map.

17. The method of claim 16 comprising: providing a graphical user interface in which to render the recording.

18. The method of claim 16 wherein executing the process according to the process map comprises:

receiving input data during execution of the process;

capturing the input data received; and associating the input data with the execution of the process, the input data capable of being associated with a future execution of the process.

19. The method of claim 16 wherein providing a capability to traverse the recording according to the process map comprises:

rendering the recording as a plurality of steps, each step rendered with at least one of:

i) an associated portion of the process map, or ii) data associated with the execution of the process at that step.

20. The method of claim 16 wherein providing a capability to traverse the recording according to the process map comprises:

providing a capability to reverse the direction of a traversal of the recording.

21. The method of claim 16 wherein providing a capability to traverse the recording according to the process map comprises:

providing an ability to invoke an automated traversal of the recording; and providing an ability to toggle between the automated traversal of the recording and a manually invoked traversal of the recording.

22. The method of claim 16 wherein providing a capability to traverse the recording according to the process map comprises:

receiving a request to traverse the recording; and authenticating the request to traverse the recording.

23. A computerized device comprising:

a memory;

a processor;

a communications interface;

an interconnection mechanism coupling the memory, the processor and the communications interface;

wherein the memory is encoded with an executed process recording and playback application that when executed on the processor is capable of recording and playing back execution of a process on the computerized device by performing the operations of:

interpreting a process map, the process map indicating a plurality of steps associated with the process and providing a visual representation of the steps, the process map further specifying one or more functions of the process to execute during execution of the process, the one or more functions associated with at least one of the plurality of steps;

executing the process according to the process map, including executing the specified one or more functions of the process according to the process map;

capturing the executed steps of the process map and associated data during execution of the process in a recording;

traversing the recording; and while traversing the recording, displaying and updating the process map according to the traversal of the recording and the steps and functions of the process map.

* * * * *